United States Patent
Ogawa et al.

(10) Patent No.: US 10,908,585 B2
(45) Date of Patent: Feb. 2, 2021

(54) EQUIPMENT INSPECTION SYSTEM AND EQUIPMENT INSPECTION METHOD WITH A PORTABLE TERMINAL

(71) Applicant: FANUC CORPORATION, Yamanashi (JP)

(72) Inventors: Shinichi Ogawa, Yamanashi (JP); Nobutomo Itani, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 6 days.

(21) Appl. No.: 16/296,554

(22) Filed: Mar. 8, 2019

(65) Prior Publication Data
US 2019/0278252 A1   Sep. 12, 2019

(30) Foreign Application Priority Data
Mar. 9, 2018 (JP) ................................ 2018-043285

(51) Int. Cl.
| | |
|---|---|
| *G06K 7/14* | (2006.01) |
| *G05B 19/4065* | (2006.01) |
| *G06K 7/10* | (2006.01) |

(52) U.S. Cl.
CPC ..... *G05B 19/4065* (2013.01); *G06K 7/10366* (2013.01); *G06K 7/1417* (2013.01); *G05B 2219/37441* (2013.01)

(58) Field of Classification Search
CPC .............. G05B 19/058; G05B 19/4065; G05B 2219/15045; G05B 2219/23406;
(Continued)

(56) References Cited

U.S. PATENT DOCUMENTS

2002/0059046 A1* 5/2002 Mifune ............... G06F 11/2294
                                                              702/188
2003/0033061 A1* 2/2003 Chen ...................... G07C 5/006
                                                              701/33.4
(Continued)

FOREIGN PATENT DOCUMENTS

| JP | 2006-48584 A | 2/2006 |
|---|---|---|
| JP | 2009-32206 A | 2/2009 |

(Continued)

*Primary Examiner* — Kidest Bahta
(74) *Attorney, Agent, or Firm* — Hauptman Ham, LLP

(57) ABSTRACT

Provided are an equipment inspection system and an equipment inspection method, which are capable of preventing an operator from skipping inspection. The equipment inspection system includes: a host computer configured to accumulate information on inspection for an industrial machine; at least one information medium, attached to the industrial machine, storing information corresponding to an inspection item of the industrial machine; a reading device configured to read the information medium; and at least one portable terminal. The portable terminal includes: a display section configured to display the inspection item corresponding to the information of the information medium read by the reading device; an input section configured to allow an operator to input an inspection result of the displayed inspection item; and a communication section capable of communicating the input inspection result with the host computer.

8 Claims, 10 Drawing Sheets

(58) Field of Classification Search
CPC ........... G05B 2219/31316; G05B 2219/37441; G06K 7/10366; G06K 7/1417
See application file for complete search history.

(56) References Cited

U.S. PATENT DOCUMENTS

| | | | | |
|---|---|---|---|---|
| 2003/0194946 | A1* | 10/2003 | Malkin | B24B 1/00 451/8 |
| 2004/0223053 | A1* | 11/2004 | Gladnick | G01N 21/8806 348/79 |
| 2009/0175694 | A1* | 7/2009 | Craig | G05B 19/124 407/37 |
| 2009/0256693 | A1* | 10/2009 | Brinton | G06Q 10/06 340/439 |
| 2010/0299179 | A1* | 11/2010 | Alonso | G06Q 10/10 705/7.36 |
| 2016/0327935 | A1* | 11/2016 | Kawai | G05B 19/4065 |
| 2017/0123397 | A1* | 5/2017 | Billi | G05B 15/02 |

FOREIGN PATENT DOCUMENTS

| | | |
|---|---|---|
| JP | 2012-63842 A | 3/2012 |
| JP | 2014-21629 A | 2/2014 |

* cited by examiner

FIG. 12

| EQUIPMENT | INSPECTION TARGET (INSPECTION ITEM TWO-DIMENSIONAL CODE) | INSPECTION ITEM | INSPECTION PERIOD |
|---|---|---|---|
| ROBOT SYSTEM | OIL LEAKAGE IN PERIPHERY | SELECT STATE | EVERYDAY |
| | OPERATION OIL AMOUNT | PICTURE OF GAUGE, SELECTION OF STATE, ENTRY OF REPLENISHMENT AMOUNT | EVERY THREE DAYS |
| MACHINE TOOL | OIL LEAKAGE IN PERIPHERY | SELECT STATE | EVERYDAY |
| | GREASE CARTRIDGE | SELECTION OF STATE, WHETHER CARTRIDGE IS REPLACED OR NOT | EVERYDAY |
| | OPERATION OIL AMOUNT | PICTURE OF GAUGE, SELECTION OF STATE, ENTRY OF REPLENISHMENT AMOUNT | EVERY THREE DAYS |
| | SPINDLE LUBRICANT OIL AMOUNT | PICTURE OF GAUGE, SELECTION OF STATE, ENTRY OF REPLENISHMENT AMOUNT | EVERYDAY |
| | MIST COLLECTOR | SELECT STATE | EVERY THREE DAYS |
| | SPINDLE COOLING OIL AMOUNT | PICTURE OF GAUGE, SELECTION OF STATE, ENTRY OF REPLENISHMENT AMOUNT | EVERY THREE DAYS |
| | OIL TEMPERATURE CONTROLLER | WHETHER ABNORMAL OPERATION SOUND IS GENERATED | EVERY NINETY DAYS |
| | | WHETHER ABNORMAL VIBRATION IS GENERATED | |
| | | WHETHER ABNORMAL HEAT IS GENERATED | |
| | | WHETHER OIL LEAKAGE IS CAUSED IN PERIPHERY | |
| | | ABNORMALITY TO BE REPORTED | |
| | AIR DRYER | WHETHER ABNORMAL OPERATION SOUND IS GENERATED | EVERY NINETY DAYS |
| | | WHETHER ABNORMAL VIBRATION IS GENERATED | |
| | | WHETHER ABNORMAL HEAT IS GENERATED | |
| | | WHETHER OIL LEAKAGE IS CAUSED IN PERIPHERY | |
| | | ABNORMALITY TO BE REPORTED | |
| COOLANT SYSTEM | OIL TEMPERATURE CONTROLLER | SELECT STATE | EVERYDAY |
| | FLOATING OIL RECOVERY DEVICE | SELECT STATE | EVERYDAY |
| | FLOATING OIL RECOVERY CAN | ENTRY OF STATE OF RECOVERY | EVERYDAY |
| | MAGNET SEPARATOR | SELECT STATE | EVERYDAY |
| | MAGNET SEPARATOR RECOVERY CAN | ENTRY OF STATE OF RECOVERY | EVERYDAY |
| | CYCLONE PRESSURE | ENTRY OF GAUGE VALUE | EVERYDAY |
| | CYCLONE PRECIPITATION TANK | ENTRY OF STATE OF RECOVERY | EVERYDAY |
| | SUCTION FILTER | SELECT STATE | EVERYDAY |
| | HIGH-PRESSURE/LOW-PRESSURE PUMP | SELECT STATE | EVERYDAY |
| | MACHINING OIL ODOR | SELECT STATE | EVERY FOURTEEN DAYS |
| | MACHINING OIL CONCENTRATION | ENTRY OF CONCENTRATION (%) | EVERY FOURTEEN DAYS |

FIG. 13

INSPECTION RESULT OF THIS WEEK

| C1 | | | JUNE 11, WED | JUNE 12, THU | JUNE 13, FRI | JUNE 14, SAT | JUNE 16, MON | JUNE 17, TUE |
|---|---|---|---|---|---|---|---|---|
| AWS1 | OIL LEAKAGE IN PERIPHERY | EVERYDAY | NORMAL | NORMAL | NORMAL | NORMAL | NORMAL | NORMAL |
| | OPERATION OIL AMOUNT | EVERY FOURTH DAY | | NONE ← 64 | | | REPLENISHED 13.0L | |
| MC1 | OIL LEAKAGE IN PERIPHERY | EVERYDAY | NORMAL | NORMAL | NORMAL | NORMAL | NORMAL | NORMAL |
| | GREASE CARTRIDGE | EVERYDAY | NONE | NONE | NONE | NONE | REPLACED | NONE |
| | OPERATION OIL AMOUNT | EVERY FOURTH DAY | | NONE | | | NONE | |
| | SPINDLE LUBRICANT OIL AMOUNT | EVERY FOURTH DAY | NONE | NONE | NONE | REPLENISHED 1.0L | NONE | NONE |
| | | | FILTER REPLACEMENT | | | NORMAL | | NORMAL |

22

US 10,908,585 B2

EQUIPMENT INSPECTION SYSTEM AND EQUIPMENT INSPECTION METHOD WITH A PORTABLE TERMINAL

RELATED APPLICATIONS

The present application claims priority of Japanese Application Number 2018-043285, filed Mar. 9, 2018, the disclosure of which is hereby incorporated by reference herein in its entirety.

BACKGROUND OF THE INVENTION

1. Field of the Invention

The present invention relates to a system and a method of performing equipment inspection with a portable terminal such as a tablet terminal.

2. Description of the Related Art

In general, in a machine factory in which industrial machines such as industrial robots and Computer Numerical Control (CNC) machine tools are installed, an operator performs maintenance and inspection for the industrial machines. As a related art, there have been known a system for supporting inspection work for equipment in a shop and a technology of downloading safety measurement items for LP gas consumption equipment and LP gas supply equipment (see JP 2006-048584 A and JP 2014-021629 A).

In many cases, a plurality of industry machines such as industrial robots and CNC machine tools are installed in a machine factory, and an operator regularly performs inspection work for each of the respective industrial machines. Usually, each of the industrial machines has a plurality of inspection items, and an inspection period of time differs depending on the inspection items. Thus, it is a heavy burden for the operator (inspector) to confirm all the inspection items without any skipping.

SUMMARY OF THE INVENTION

One aspect of the present disclosure is an equipment inspection system, comprising: a host computer configured to accumulate information on inspection for an industrial machine; at least one information medium, attached to the industrial machine, storing information corresponding to an inspection item of the industrial machine; a reading device configured to read information from the information medium; and at least one portable terminal including a display section configured to display the inspection item corresponding to the information read by the reading device, an input section configured to allow an operator to input an inspection result of the inspection item displayed on the display section, and a communication section capable of communicating the input inspection result with the host computer.

Another aspect of the present disclosure is an equipment inspection method, comprising: accumulating information on inspection for an industrial machine in a host computer; attaching at least one information medium, storing information corresponding to an inspection item of the industrial machine, to the industrial machine; reading the information of the at least one information medium; displaying the inspection item corresponding to the at least one information medium, which is read, on a portable terminal; and communicating an inspection result of the inspection item, which is input by an operator with the portable terminal, with the host computer.

BRIEF DESCRIPTION OF THE DRAWINGS

The above and other objects, features and advantages of the present invention will be made more apparent by the following description of the preferred embodiments thereof, with reference to the accompanying drawings, wherein:

FIG. 12 is a table for showing examples of maintenance and inspection items; and FIG. 13 is a table for showing an example in which inspection result data is accumulated in a host computer.

DETAILED DESCRIPTION

Figure 1:
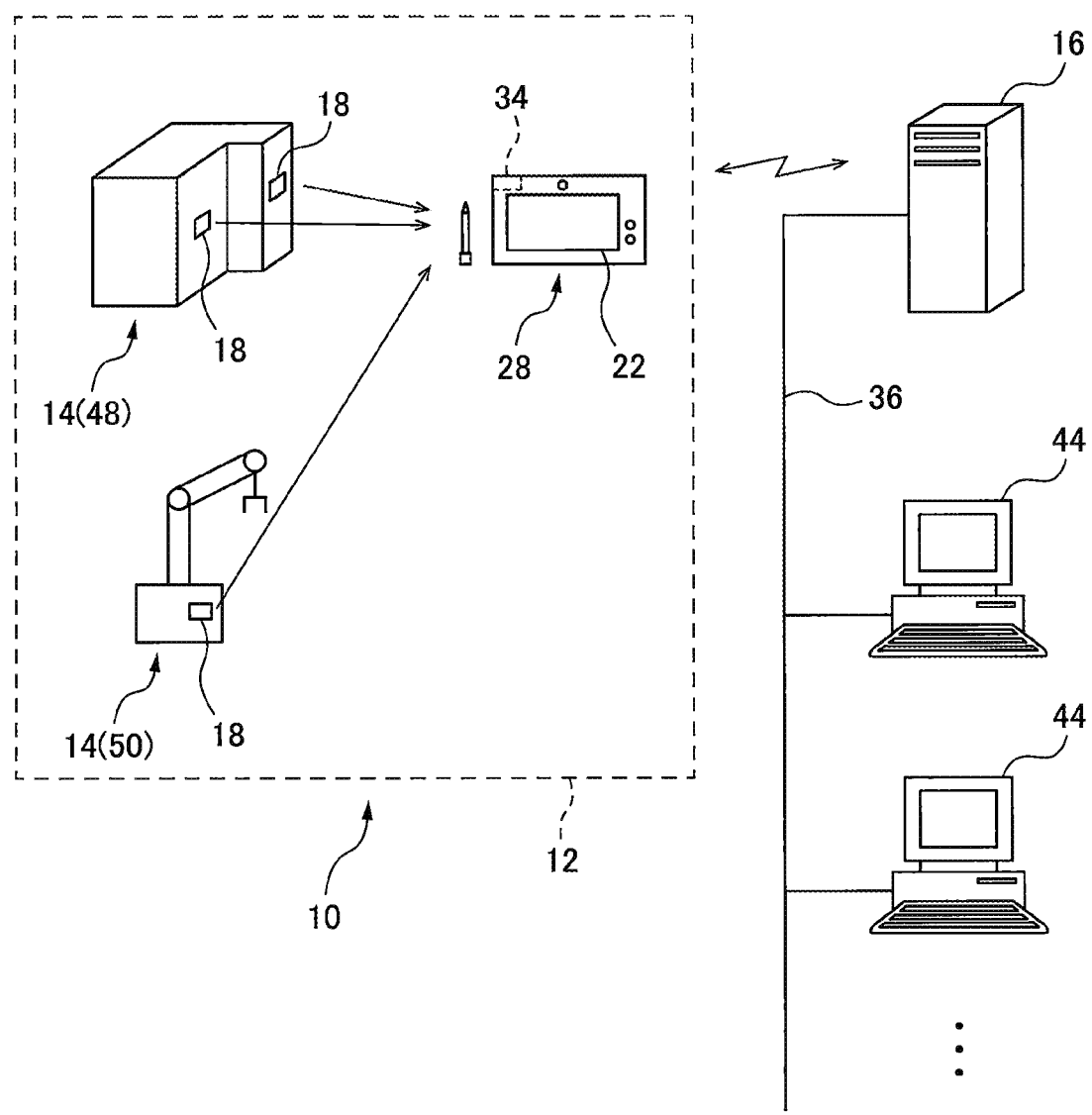
FIG. 1 is a diagram for illustrating a configuration example of an equipment inspection system according to one embodiment.
Figure 2:
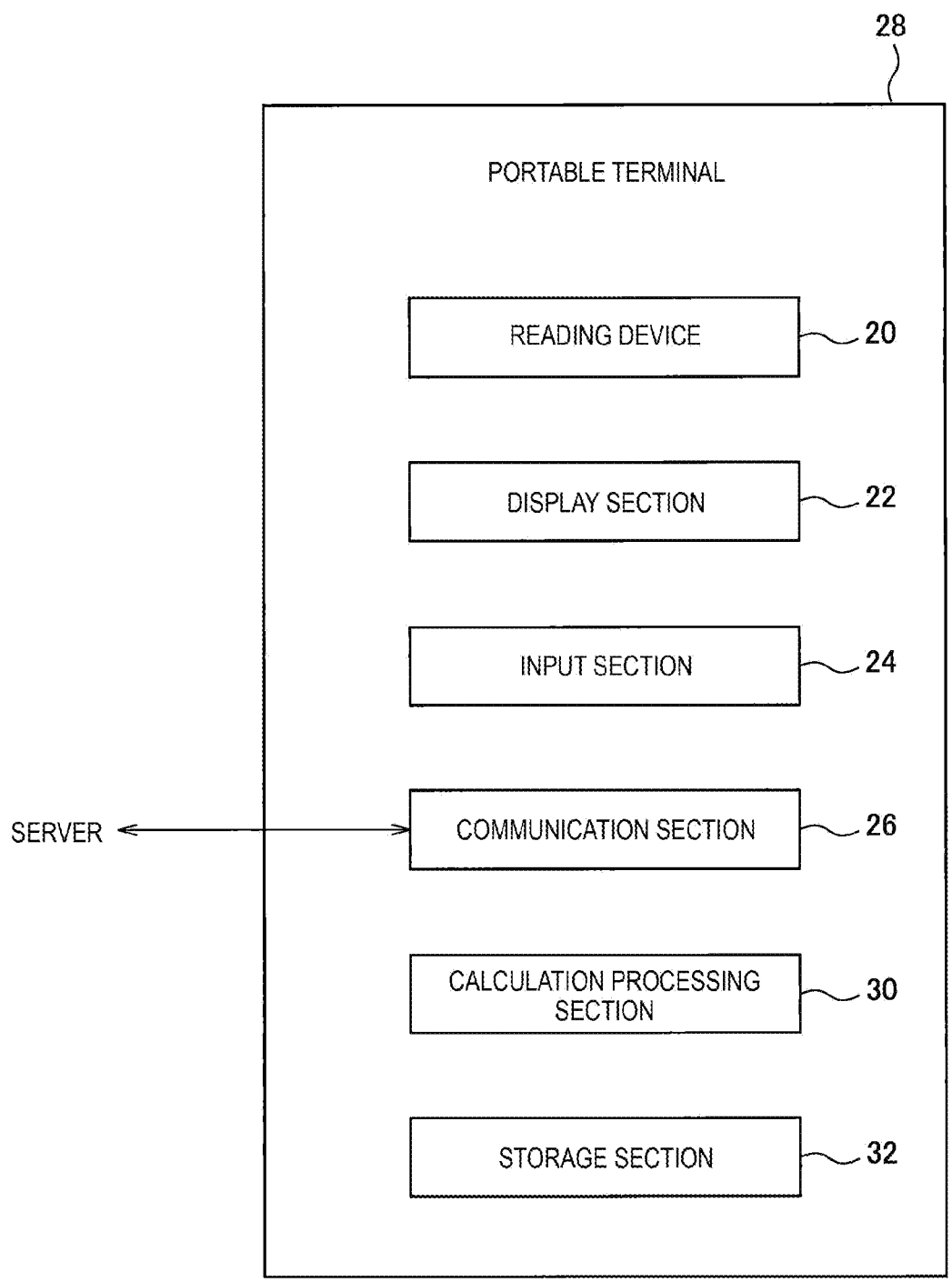
FIG. 2 is a block diagram for illustrating a configuration example of a portable terminal.

FIG. 1 is a diagram for illustrating a configuration example of an equipment inspection system according to an embodiment of the present disclosure. FIG. 2 is a function block diagram of a portable terminal used for the equipment inspection system. An equipment inspection system 10 includes a host computer (server) 16, at least one information medium 18, a reading device 20, and at least one portable terminal 28. The host computer (server) 16 is configured to accumulate information on inspection for at least one industrial machine 14 installed in a machine factory (schematically indicated with the broken line 12). The information medium 18, attached to the industrial machine 14, stores information corresponding to inspection items of the industrial machine 14. The reading device 20 is configured to read the information stored in the information medium 18. The portable terminal 28 includes a display section 22, an input section 24, and a communication section 26. The display section 22 such as a liquid crystal display screen is configured to display the inspection items corresponding to the information in the information medium 18, which is read by the reading device 20. The input section 24 is, for example, a touch panel or a keyboard, etc., configured to an operator to input inspection results of the inspection items displayed on the display section 22. The communication section 26 is capable of communicating the input inspection results with the host computer 16 (generally, in a wireless manner).

The portable terminal 28 is, for example, a tablet terminal or a smartphone, and has such a shape and weight that the operator moving in the machine factory 12 can easily hold it. The portable terminal 28 may further include a calculation processing section 30 such as a CPU for performing a process described later, and a storage section 32 such as a memory. Further, for example, a camera 34 (schematically illustrated in FIG. 1) is mounted on the portable terminal 28, and is configured to capture an image of the information medium 18. With this, the reading device 20 can read the information from the information medium 18 by processing the image captured by the camera to image processing.

Here, as an example of the information medium 18, a two-dimensional code such as a QR code (registered trademark), a one-dimensional code such as a bar-code, and an ID tag such as an RFID are given. Further, as a reading device for the information medium 18, a bar-code reader, an RFID reader, and the camera provided to the tablet terminal 28 are given. Note that, when a tablet terminal is used as the portable terminal 28 and the camera mounted to the tablet terminal is used as the reading device 20, the operator is not required to hold the portable terminal and the reading device separately. Accordingly, the burden of the operator can be alleviated.

Figure 3:
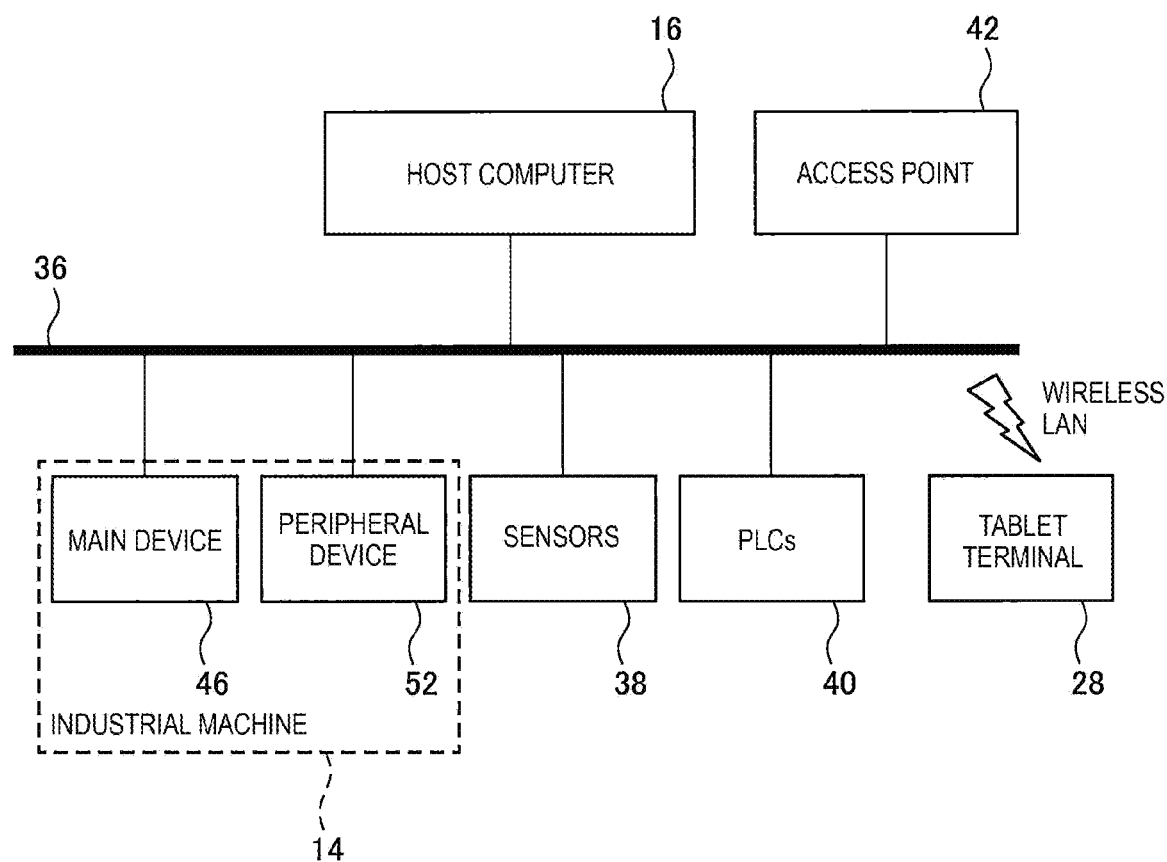
FIG. 3 is a diagram for illustrating an example of a network structure of the equipment inspection system of FIG. 1.
Figure 4:
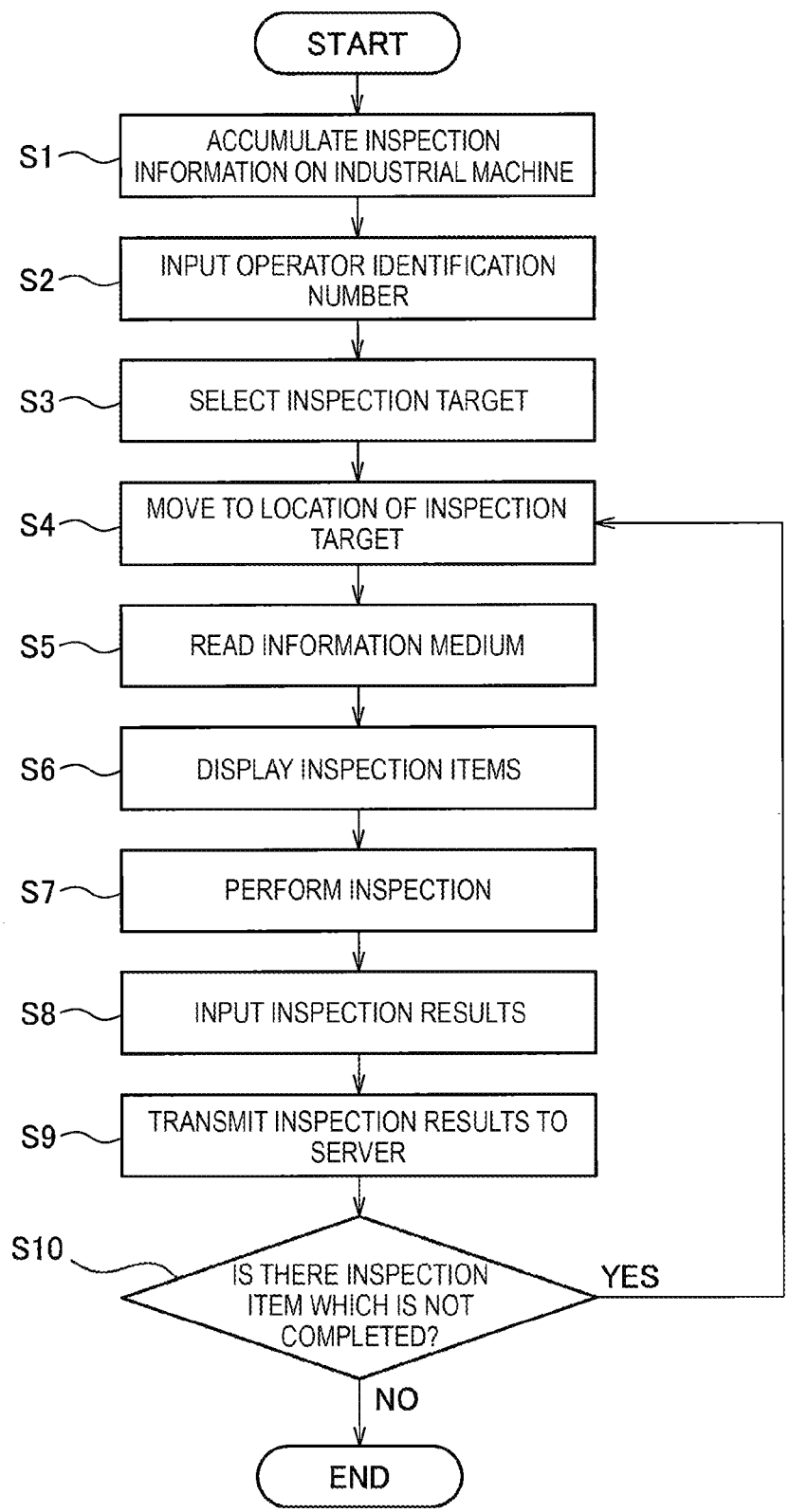
FIG. 4 is a flowchart for illustrating a procedure of the equipment inspection.

FIG. 3 is a diagram for illustrating an example of a network structure of the equipment inspection system 10. The host computer 16, the industrial machine 14, sensors 38, programmable logic controllers (PLCs) 40, and an access point 42 are connected to a network 36 such as a factory LAN. The portable terminal 28 such as a tablet terminal is wirelessly communicable with the host computer 16. Further, data on operating states, etc., of the industrial machine 14, the sensors 38, and the PLCs 40 can be transmitted to the host computer 16 via the network 36. With such a network structure, data on operating states and inspection states of all equipment in the machine factory 12 can be viewed, and the data can easily be analyzed. Further, in a case where a certain inspection item is skipped, the skipped inspection item can easily be specified. Moreover, the host computer 16 can inform a manager, etc., of the skipping of the inspection item. Accordingly, the manager can give an instruction for prompt the operator in charge to perform inspection.

Further, as illustrated in FIG. 1, one or more client computers 44 such as a personal computer may be connected to the network 36. Note that, in FIG. 1, the host computer 16 and the personal computer 44 are installed outside of the machine factory 12, but may be installed inside the machine factory 12.

As illustrated in FIG. 3, the industrial machine 14 includes at least one main device 46. Among the industrial machines installed in the machine factory 12, "main device" in the present disclosure indicates a machine or an apparatus capable of performing work, such as machining and conveyance, independently from other machines. Specifically, a machine tool 48 such as an NC machine tool and an industrial robot 50, which are illustrated in FIG. 1, a manufacturing machine, a processing machine, a conveyor, and a crane (not shown) are exemplified as the main device.

Further, the industrial machine 14 may include a peripheral device 52 in some cases. Among the industrial machines installed in the machine factory 12, "peripheral device" in the present disclosure indicates a machine or an apparatus used in combination with the main device 46. Specifically, a supply device for supplying cooling water or lubricant oil to the main device 46, and a mist collector for recovering oil mist generated from the machine tool 48, etc., are exemplified as the peripheral device.

Next, a procedure of the equipment inspection in this embodiment is described with reference with the flowchart of FIG. 4 and FIG. 5 to FIG. 13. Here, description is made of a case where the tablet terminal is used as the portable terminal 28 and the camera mounted to the tablet terminal is used as the reading device 20.

Figure 5:
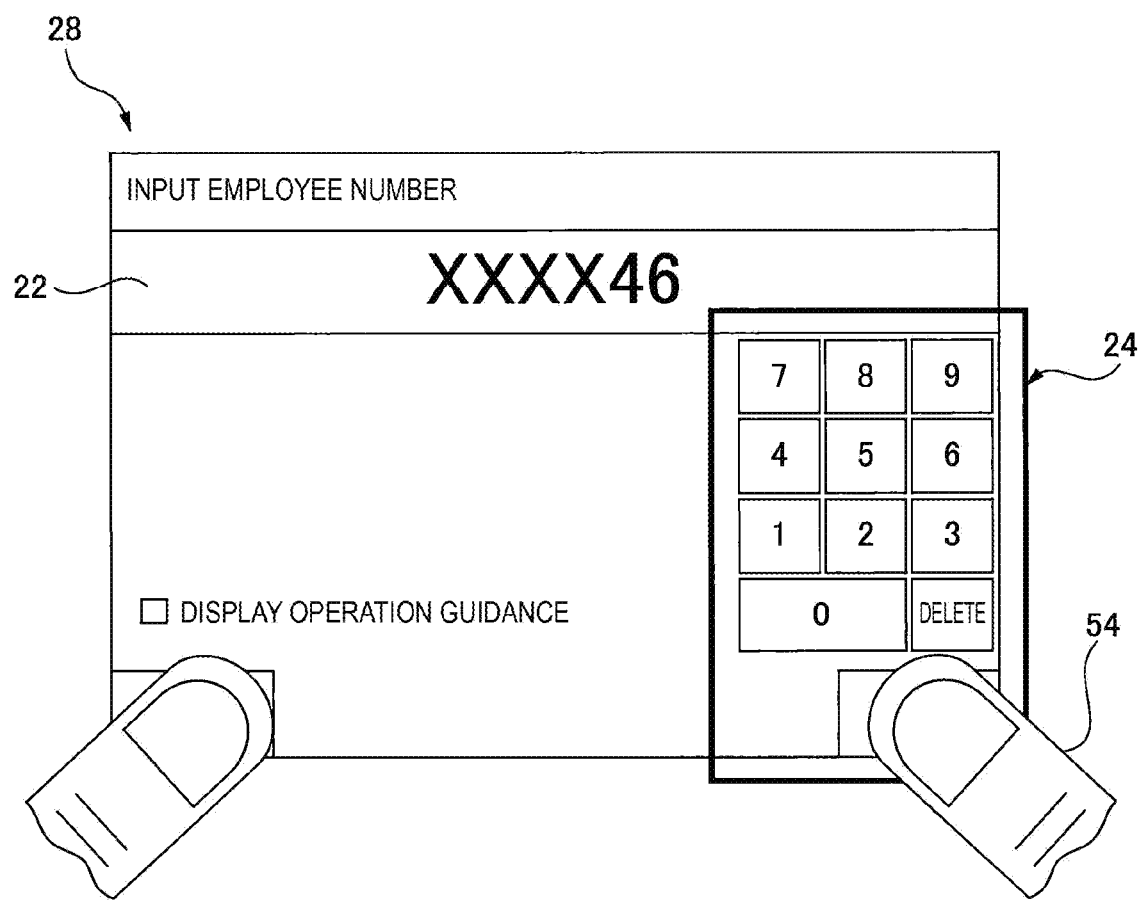
FIG. 5 is a diagram for illustrating a screen display example of a tablet terminal for equipment inspection work.

First, before the operator performs the inspection, the information on the equipment inspection (maintenance inspection) for the industrial machine 14 in the machine factory 12 is stored and accumulated in the host computer (server) 16 (Step S1). Next, as illustrated in FIG. 5, the operator 54 (only a finger of the operator is illustrated) holds the portable terminal (here, the tablet) 28, and inputs a number such as an employee number for identifying the operator with the input section 24 such as a ten-key displayed on the display section (screen) 22 of the tablet terminal 28 (Step S2). Note that, Step S2 may be skipped, or other processes such as fingerprint authentication may be used in order to identify the operator.

Figure 6:
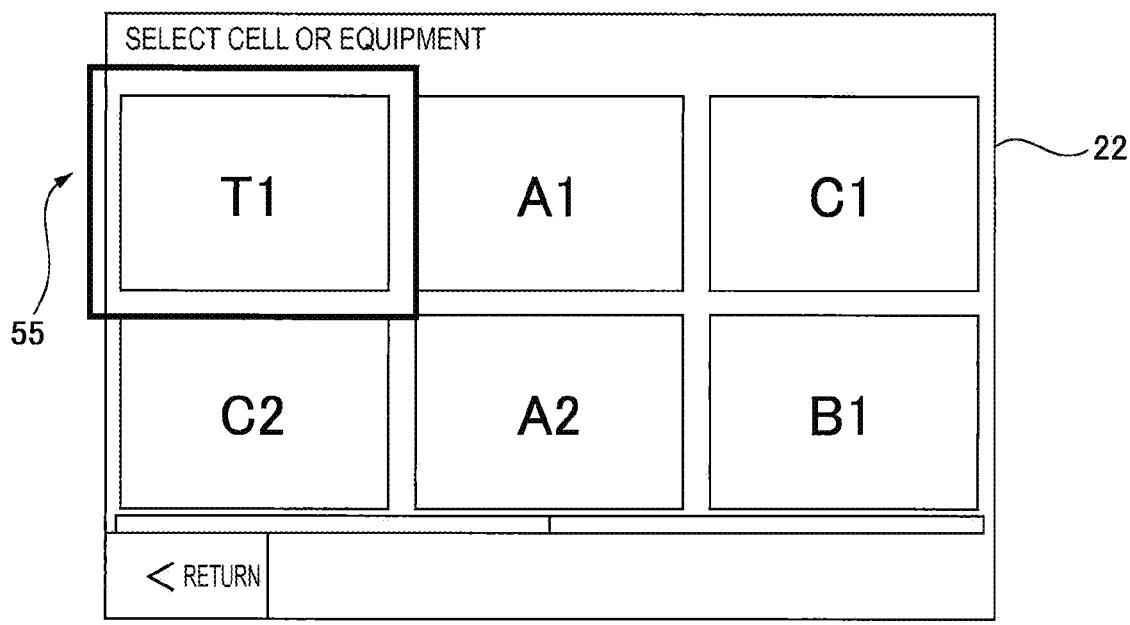
FIG. 6 is a diagram for illustrating a screen display example of the tablet terminal for the equipment inspection work.

Next, in Step S3, as illustrated in FIG. 6, a menu 55 for selecting the equipment (or a cell including the plurality of equipment) included in the machine factory is displayed on the display section 22 of the tablet terminal 28. Sequentially, the operator selects the equipment being an inspection target (here, the main device or the periphery device) with touch operation onto the screen. Note that, in Step S3, the cell including the plurality of equipment (such as a processing cell) may be selected from the menu 55. When the cell is selected, the state of inspection progress of each piece of equipment included in the cell can be displayed on the tablet terminal 28.

Figure 7:
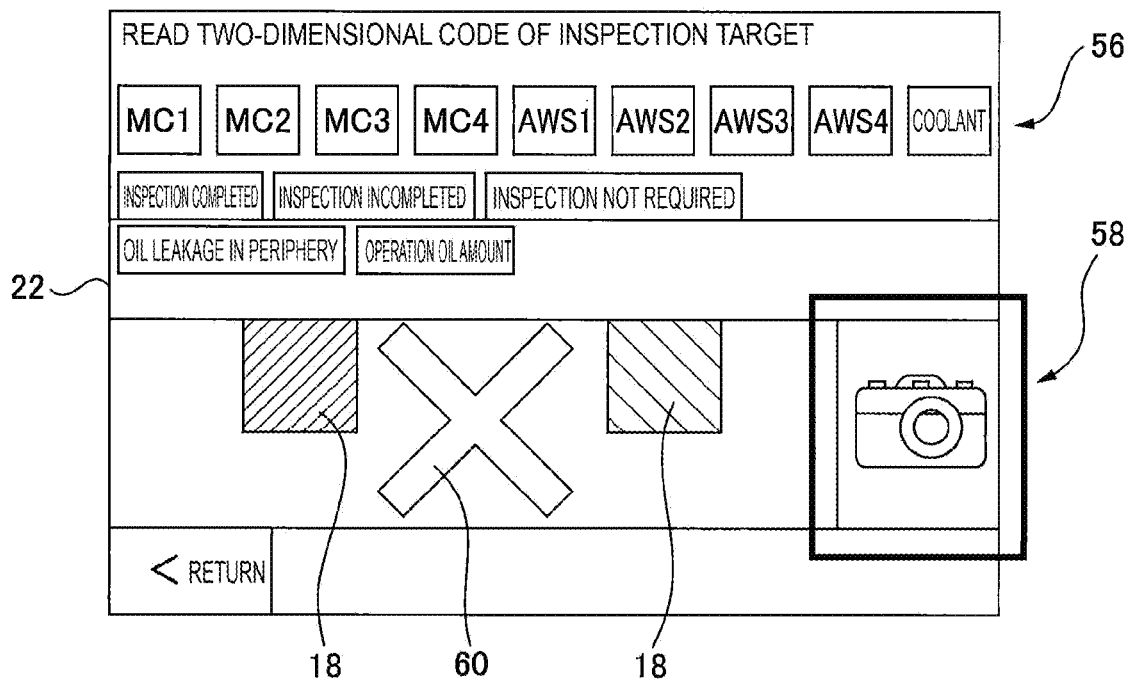
FIG. 7 is a diagram for illustrating a screen display example of the tablet terminal for the equipment inspection work.

When the equipment being the inspection target is selected, as illustrated in FIG. 7, the maintenance and inspection items to be performed for the selected inspection target are displayed. Further, at this stage, information indicating, for example, whether each of the inspection items is completed, incompleted, or not required at the moment may be transmitted from the host computer 16 to the tablet terminal 28 so that the operator can recognize the information with a color-coded display, etc. Therefore, the operator can easily grasp an accurate state of inspection progress, etc., at the moment for the equipment selected in Step S2.

Figure 8:
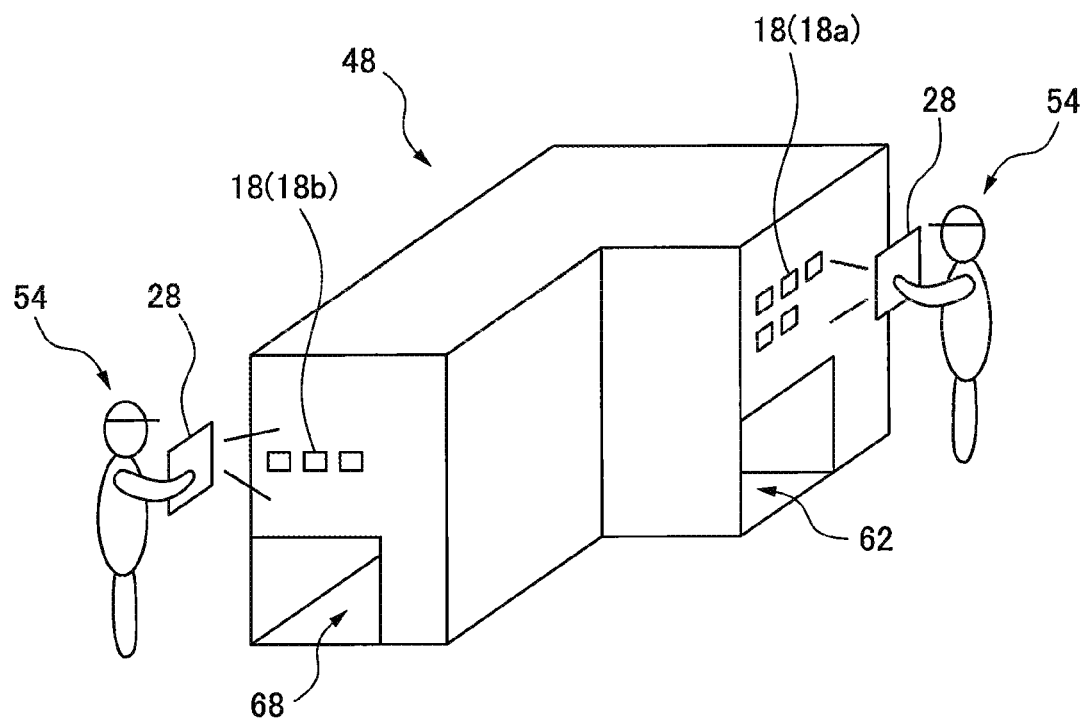
FIG. 8 is a diagram for illustrating an example in which a plurality of two-dimensional codes are provided to a machine tool.

As illustrated in FIG. 7, when the equipment being the inspection target is selected, an instruction (such as a camera mark 58) for prompting acquisition of the information in the information medium such as a two-dimensional code attached to the inspection target is displayed on the display section 22 of the tablet terminal 28. Further, as illustrated in FIG. 8, the operator moves to a position where the operator can capture an image of the information medium 18 (the two-dimensional code in this case), which is attached to the selected equipment being the inspection target (corresponding to the machine tool 48 in this case), with the camera of the tablet terminal 28 (Step S4), and captures an image of the two-dimensional code 18. With this action, the tablet terminal 28 can read the information from the two-dimensional code (Step S5). Note that, the process of reading the information from the acquired image of the two-dimensional code may be performed by the CPU, etc., in the tablet terminal 28, or the acquired image may be transmitted to the host computer 16 in order to perform a reading process in the host computer 16 and transmit the read result to the tablet terminal 28.

Here, in a case where the equipment selected in Step S3 and the equipment corresponding to the two-dimensional code captured in the image (the equipment to which the two-dimensional code is attached) are different from each other, the information in the two-dimensional code overrides the other. Further, in a case where the information in the two-dimensional code cannot accurately be read, for example, a case where two of the two-dimensional codes 18 appear in a visual field of the camera, display (e.g., an image or character such as an "X" mark 60) for informing the operator of such situation can be displayed on the display section 22.

Figure 9:
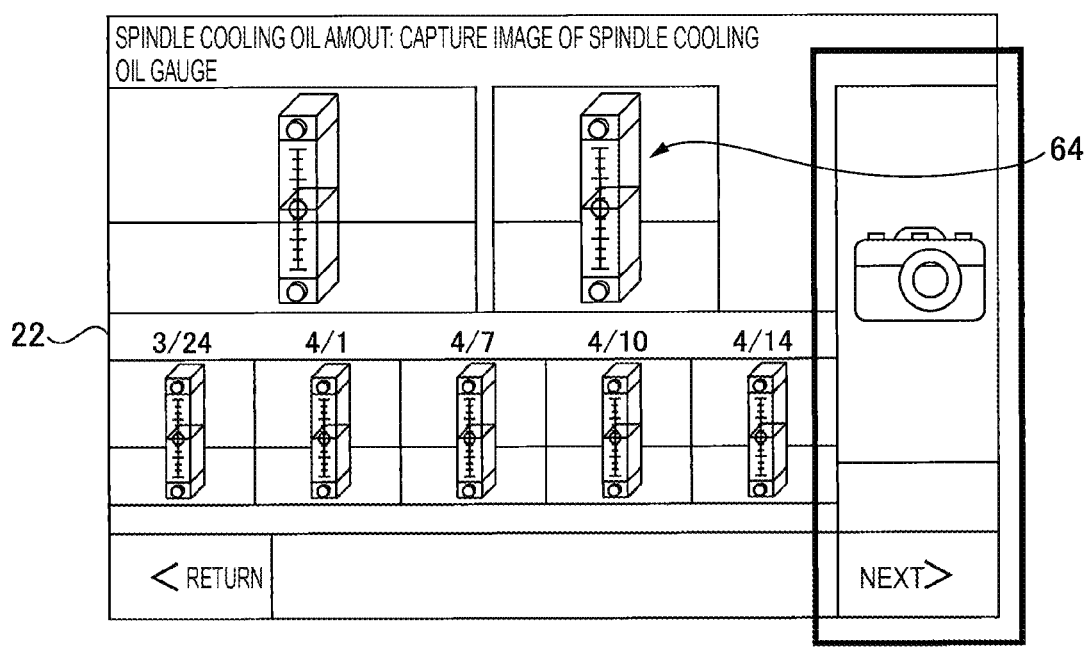
FIG. 9 is a diagram for illustrating a screen display example of the tablet terminal for the equipment inspection work.

Here, the two-dimensional code 18 is associated with the inspection items (maintenance and inspection items) for the equipment being the inspection target. As illustrated in FIG. 9, by reading the two-dimensional code 18, the inspection items corresponding to the read two-dimensional code and the inspection contents are displayed on the tablet terminal 28 (Step S6). Here, as an example of the maintenance and inspection item, what is displayed is an instruction for performing inspection to confirm whether or not an amount of oil for cooling a spindle of a machine tool (spindle cooling oil amount) is normal.

Further, in this case, as a means for measuring the oil amount, a float-type level gauge 64 installed in a first region 62 of the machine tool 48 (see FIG. 8) is used. In this case, as maintenance inspection, the operator captures an image of the level gauge 64 with the tablet terminal 28 in such a manner that at least a position of the float (the oil amount) can be recognized (Step S7). The resultant captured image is input to and displayed on the tablet terminal 28 (Step S8). Further, when the oil amount is less than a predetermined amount, the operator replenishes the cooling oil, and inputs the replenishment amount to the tablet terminal 28 (Steps S7 to S8).

At this time, as illustrated in FIG. 9, the image (data), in which the same level gauge 64 (in the normal state) was captured in the past, accumulated in the host computer 16 may be received from the host computer 16 and displayed on the screen. In this case, the operator can easily determine whether or not the current oil amount falls within a normal range by comparing the past image and the image captured this time (specifically, comparing the positions of the floats of the level gauges 64). Note that, when the memory of the tablet terminal 28 has a margin, the past data may be saved in the memory. In this case, the past data is not required to be received from the host computer 16.

As another method of measuring the oil amount, the operator may directly read a scale of the level gauge 64 (the position of the float) and may input the read value (numerical value) to the tablet terminal 28 as the inspection result. Also in this case, when the past image of the gauge or the past input data is displayed on the screen, the operator can determine whether or not the current oil amount falls within a normal range by comparing the past data (image) and the data input this time.

The maintenance and inspection result (the image, the input numerical value, etc.) input by the operator is transmitted from the communication section 26 of the tablet terminal 28 to the host computer (server) 16 (Step S9), and the host computer 16 accumulates the transmitted data as the maintenance and inspection result. The accumulated data can be viewed with other terminals 44, etc., connected to the network 36. Therefore, not only at the site, but also at an office away from the site, for example, the accumulated data can be acquired, and analysis based on the acquired data can be performed.

The processes in Steps S4 to S9 are repeated until all the inspection items are completed (Step S10). In this manner, all the inspection items can be completed without any skipping.

FIG. 13 is a table for showing a display example of an inspection history based on the inspection results, specifically, showing the inspection results of the above-mentioned level gauge 64, which are accumulated in the host computer 16. In this example, the specific inspection contents for the respective inspection items (the resultant captured image of the gauge, the oil replenishment amount, etc.) are displayed in a chronological order. Thus, when inspection is skipped, a name, time, etc., of the skipped inspection can easily be grasped. In this manner, the tabulation processing and analysis processing of the inspection results can be automatized in the host computer 16. The results can be viewed with the other terminals 44, etc., through the network 36.

FIG. 8 is a diagram for illustrating an example in which the main device such as the machine tool 48 has a plurality of inspection items, and one two-dimensional code corresponds to one inspection item. For example, in addition to the above-mentioned level gauge 64, there are devices and measurement instruments corresponding to four inspection items in the first region 62 of the machine tool 48. As examples of the inspection items, presence or absence of an oil leakage in the vicinity of the first region 62, and checking of a numerical value of a pressure gauge provided in the first region 62, etc., are given. Therefore, in the example of FIG. 8, before inspection corresponding to one inspection item is performed, the operator is always required to capture an image of the two-dimensional code corresponding to the inspection item with the tablet terminal 28. In other words, the following conditions can be set. That is, the inspection item corresponding to the information cannot be displayed unless the operator acquires the information in the information medium 18 attached to the industrial machine being the inspection target. Further, the inspection results corresponding to the inspection item cannot be input to the tablet terminal unless the inspection item is displayed.

Figure 10:
FIG. 10 is a diagram for illustrating a screen display example of the tablet terminal for the equipment inspection work.

Further, FIG. 10 is a diagram of a display example in which the two-dimensional code corresponding to the above-mentioned oil leakage is captured in an image. The operator determines with his or her eyes whether or not a state regarding the oil leakage is normal, abnormal (a breakage of an oil tank, etc., are indicated), or is normal but requires cleaning of a floor surface and the like. Then, the determination result is input (selected) by the operator, from a menu 66 as the maintenance and inspection result.

Figure 11:
FIG. 11 is a diagram for illustrating a screen display example of the tablet terminal for the equipment inspection work.

Further, FIG. 11 is a diagram of a display example in which the two-dimensional code corresponding to the above-mentioned pressure gauge is captured in an image. The operator reads a value of the pressure gauge, and inputs the read numerical value with the input section 24 such as a ten-key displayed on the screen.

As described above, the industrial machine has various inspection items, and most of the inspection items can be measured and determined with the eyes of the operator at the site. However, even in the case of the inspection items, which can automatically be measured with a sensor, etc., and enables the measured data to be transmitted automatically and regularly to the server (that is, the visual observation and confirmation of the operator are not required basically), the operator may use another measurement instrument at the site so that the sensor can be corrected and presence or absence of a breakage of the sensor can be determined. Thus, such inspection items may also be used in the embodiment. For example, although the concentration of machining oil can be monitored by a sensor, etc., at all times, the operator can be at the site, perform sampling of the machining oil, and measure the concentration with a handy-type concentration meter. In this manner, it can be judged as to whether or not the sensor operates normally. In general, by regularly gathering the data indicating the equipment abnormality, such as the temperature of the operating oil, appropriate measures can be taken before the equipment breaks. Further, even before the equipment breaks, the data, which may cause a processing defect of, for example, the machining oil concentration, is regularly gathered. As a result, the processing defect can be prevented, and the productive efficiency of the equipment can be improved.

FIG. 12 is a diagram for illustrating an example of the inspection items of the industrial machines. Usually, one equipment has a plurality of inspection items, and even for the same equipment, inspection locations corresponding to the respective inspection items may be different from one another. For example, as illustrated in FIG. 8, the number of the inspection items that can be performed in or in the vicinity of the first region 62 is five, while the number of the inspection items that can be performed in or in the vicinity of a second region 68 is three. In such case, it is preferred that five two-dimensional codes 18a be provided at portions in the vicinity of the first region 62 of the machine tool 48, and that three two-dimensional codes 18b be provided at portions in the vicinity of the second region 68. The information (data) regarding the maintenance and inspection of the industrial machines as shown in FIG. 12 is accumulated in the host computer in advance. The information is partially transmitted to the tablet terminal 28 as the inspection item corresponding to the information medium and the inspection contents (inspection work). In this manner, only the information required for the inspection can be displayed on the tablet terminal 28.

The information medium such as the two-dimensional code attached to each equipment is not for recognizing and specifying the equipment itself; but is associated with the inspection item of the equipment. In other words, the information medium is used in order to display each of the inspection items for the operator. Therefore, it is preferred that one information medium such as a two-dimensional code be provided with respect to one inspection item. With this, it is always required to read the information medium before each inspection item is performed. Accordingly, it seems troublesome for the operator as compared to a case where all the inspection items of equipment are displayed when one information medium attached to one equipment is read.

However, in the case where all the inspection items for one equipment are listed with one process, similarly to the case where the inspection results are written on a related-art inspection sheet (check sheet), there may be the following risks. For example, some inspection items are skipped, the operator enters (inputs) the inspection results to wrong places, or the operator fails to move to a predetermined location. Skipping and misinput of the inspection items lead to the overlooking of equipment abnormality. When the equipment abnormality is left as it is, a serious problem such as the stopping of a production line arises. As a result, the operator actually bears a heavy burden.

In view of the above, in the embodiment, before inspection work corresponding to each of the inspection items is performed, the operator is requested to perform an operation for causing the information medium corresponding to the inspection item to be read. In this manner, the operator can be caused to clearly recognize the inspection work to be performed, and hence risks of inspection skipping and misinput can significantly be reduced as compared to the related art. Further, by arranging the information medium in the vicinity of the target (a level gauge and a pressure meter, etc.) of the inspection item corresponding to the information medium, the operator can perform the inspection of the inspection target (the inspection item) at the position substantially same as the position where the information medium is read (for example, the two-dimensional code is captured in an image with the tablet terminal). As a result, a defect caused by, for example, the operator, who mistakenly inputs the inspection results (due to imagination, etc.) even though the inspection is not actually performed, can be prevented.

As described above, in many cases, an industrial machine has a plurality of inspection items. As illustrated in FIG. 8, a location where inspection work is performed differs depending on the inspection items. Further, as shown in FIG. 12, also an inspection period differs depending on the inspection items. Thus, with regard to the main device including at least one of a machine tool and an industrial robot, it is preferred that one information medium corresponds to one inspection item. However, in some cases, the peripheral device such as an oil temperature controller and an air dryer (see FIG. 12) includes a plurality of inspection items for which determination can instantly be made with the five senses of the operator, such as presence or absence of an abnormal sound and vibration. Thus, in such a case, it may not be suitable to cause the operator to read one information medium for one inspection item. In view of this, with regard to the peripheral device, one information medium may correspond to a plurality of inspection items (particularly, items for which determination can be made with the five senses).

Further, in the present disclosure, a program for causing the host computer or the portable terminal to perform processes other than the processes performed by the operator among the above-mentioned processes may be stored in the host computer or the portable terminal. For example, with the program, the following process is performed with the portable terminal. That is, the inspection item corresponding to the information in the information medium read by the reading device is displayed on the display section of the portable terminal. After the operator inputs an inspection result corresponding to the inspection item to the input section, the inspection result is transmitted from the communication section to the host computer. Further, such a program can be provided in a form of a computer readable recording medium (such as a CD-ROM, a USB memory, etc.) in which the program is recorded.

According to the present disclosure, the operator can be prevented from skipping the inspection items for the industrial machine, and the reliability and operation efficiency of the industrial machine can be improved.

While the invention has been described with reference to specific embodiments, it will be understood, by those skilled in the art, that various changes or modifications may be made thereto without departing from the scope of the following claims.

The invention claimed is:

1. An equipment inspection system, comprising:
a host computer configured to accumulate information on inspection for an industrial machine;

at least one information medium, attached to the industrial machine, storing information corresponding to an inspection item of the industrial machine;

a reading device configured to read the information from the at least one information medium; and at least one portable terminal including:
- a display configured to
  - display a menu for an operator to select an inspection target,
  - in response to a determination that the selected inspection target is different from the inspection item corresponding to the information read by the reading device, display the inspection item corresponding to the information read by the reading device and not display the selected inspection target;
- an input section configured to allow the operator to input an inspection result of the inspection item displayed on the display; and
- a communication section configured to communicate the inspection result with the host computer.

2. The equipment inspection system according to claim 1, wherein the industrial machine includes at least one main device, and a peripheral device configured to be used in combination with the at least one main device, wherein the at least one information medium comprises a plurality of information media attached to the at least one main device, wherein the plurality of information media is configured to store information corresponding to inspection items different from each other, each information medium of the plurality of information media attached to the at least one main device being configured to store information corresponding to one of the inspection items, wherein the peripheral device includes one or more information media attached thereto, and wherein each information medium of the one or more information media attached to the peripheral device is configured to store information corresponding to a plurality of inspection items among the inspection items.

3. The equipment inspection system according to claim 2, wherein the at least one main device comprises at least one of a machine tool and an industrial robot.

4. The equipment inspection system according to claim 1, wherein the at least one information medium is a two-dimensional code, and wherein the reading device includes a camera provided to the at least one portable terminal.

5. The equipment inspection system according to claim 1, wherein the display is further configured to display the inspection result, which is input by the operator, and a past inspection result of the inspection item corresponding to the inspection result.

6. An equipment inspection method, comprising:

accumulating information on inspection for an industrial machine in a host computer;

attaching at least one information medium, which stores information corresponding to an inspection item of the industrial machine, to the industrial machine;

reading the information of the at least one information medium;

displaying a menu for an operator to select an inspection target in response to a determination that the selected inspection target is different from the inspection item corresponding to the information of the at least one information medium, displaying, on a portable terminal, the inspection item corresponding to the information of the at least one information medium, and not displaying, on the portable terminal, the selected inspection target; and communicating, by the portable terminal, an inspection result of the inspection item, which is input by the operator into the portable terminal, to the host computer.

7. The equipment inspection system according to claim 1, wherein the display is configured to display an instruction to prompt the operator to acquire the information from the at least one information medium.

8. The equipment inspection system according to claim 1, wherein the display is configured to display an inspection item to be performed for the selected inspection target in response to the selection of the inspection target, and stop displaying the inspection item to be performed for the selected inspection target in response to the determination that the selected inspection target is different from the inspection item corresponding to the information read by the reading device.

* * * * *